US011734371B2

(12) United States Patent
Bastide et al.

(10) Patent No.: US 11,734,371 B2
(45) Date of Patent: *Aug. 22, 2023

(54) MULTI-SENSORY CONTENT AUTHORSHIP AID

(71) Applicant: INTERNATIONAL BUSINESS MACHINES CORPORATION, Armonk, NY (US)

(72) Inventors: Paul R. Bastide, Ashland, MA (US); Robert E. Loredo, North Miami Beach, FL (US); Matthew E. Broomhall, Goffstown, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,339

(22) Filed: Apr. 29, 2022

(65) Prior Publication Data

US 2022/0253498 A1 Aug. 11, 2022

Related U.S. Application Data

(63) Continuation of application No. 16/453,430, filed on Jun. 26, 2019, now Pat. No. 11,361,043.

(51) Int. Cl.
*G06F 16/9537* (2019.01)
*G06F 16/9535* (2019.01)
*G06F 16/9538* (2019.01)

(52) U.S. Cl.
CPC ...... *G06F 16/9537* (2019.01); *G06F 16/9535* (2019.01); *G06F 16/9538* (2019.01)

(58) Field of Classification Search
None
See application file for complete search history.

(56) References Cited

U.S. PATENT DOCUMENTS

| 9,892,103 B2 | 2/2018 | Manolescu |
| 2016/0063881 A1* | 3/2016 | Brinton ............... G09B 5/02 434/353 |

(Continued)

FOREIGN PATENT DOCUMENTS

| WO | 2010080101 A1 | 7/2010 |
| WO | 2016085520 A1 | 6/2016 |
| WO | 2017035514 A1 | 3/2017 |

OTHER PUBLICATIONS

Apache, "Spatial Search," Apache Solr Reference Guide, Last Updated Jun. 9, 2017, p. 1-24, Version 6.6, https://lucene.apache.org/solr/guide/6_6/spatial-search.html, Accessed on Jun. 25, 2019.

(Continued)

*Primary Examiner* — Amresh Singh
(74) *Attorney, Agent, or Firm* — Andre L. Adkins

(57) ABSTRACT

A method, computer system, and a computer program product for recommending additional content to an author generating authored content is provided. The present invention may include monitoring a travel location associated with the author. The present invention may include calculating a multi-sensory region based on the travel location and a maximum sense distance value. The present invention may include selecting at least one piece of additional content from a corpus of additional content based on the multi-sensory region. The present invention may include generating a model based on the at least one piece of additional content. The present invention may include selecting a relevant piece of additional content from the data model based on determining a topic associated with the relevant piece of additional content matches an authored topic associated with the authored content. The present invention may include presenting the selected relevant piece of additional content to the author.

17 Claims, 5 Drawing Sheets

(56) References Cited

U.S. PATENT DOCUMENTS

2017/0220668 A1 8/2017 Patton
2017/0300535 A1 10/2017 Papineni

OTHER PUBLICATIONS

Cooper, "28 Twitter Statistics All Marketers Need to Know in 2019," Hootsuite Blog, Jan. 16, 2019, p. 1-7, https://blog.hootsuite.com/twitter-statistics/, Accessed on Jun. 25, 2019.

Hata, "Analyzing, Improving, and Leveraging Crowdsourced Visual Knowledge Representations," Stanford University Thesis, Jun. 2017, p. 1-146.

Kovashka et al., "Crowdsourcing in Computer Vision," Foundations and Trends in Computer Graphics and Vision, 2014, 69 Pages, vol. 10, No. 3.

Li et al., "Crowdsourcing Narrative Intelligence," Advances in Cognitive Systems, 2012, p. 1-18, Cognitive Systems Foundation.

Mell et al., "The NIST Definition of Cloud Computing," National Institute of Standards and Technology, Sep. 2011, p. 1-3, Special Publication 800-145.

Nguyen et al., "Using Crowdsourcing to Investigate Perception of Narrative Similarity," CIKM'14, Nov. 3-7, 2014, 10 Pages, ACM, Shanghai, China.

Pending U.S. Appl. No. 16/453,430, filed Jun. 26, 2019, entitled, "Multi-Sensory Content Authorship Aid," 37 pages.

Su et al., "Crowdsourcing Annotations for Visual Object Detection," Twenty-Sixth AAAI Conference on Artificial Intelligence—Human Computation Workshop, 2012, p. 40-46, AAAI Technical Report WS-12-08, Association for the Advancement of Artificial Intelligence.

Twitter, "Enterprise Data," Twitter Developers, p. 1-7, https://developer.twitter.com/en/enterprise, Accessed on Mar. 25, 2019.

Twitter, "Filtering Tweets by Location," Twitter Developers, p. 1-11, https://developer.twitter.com/en/docs/tutorials/filtering-tweets-by-location.html, Accessed on Jun. 25, 2019.

Wikipedia, "Writer's Block," Wikipedia: the Free Encyclopedia, Last Edited on Jun. 4, 2019, p. 1-4, https://en.wikipedia.org/wiki/Writer's_block, Accessed on Jun. 25, 2019.

IBM, List of IBM Patents or Patent Applications Treated as Related, Appendix P, dated Apr. 29, 2022, 2 pages.

\* cited by examiner

MULTI-SENSORY CONTENT AUTHORSHIP AID

BACKGROUND

The present invention relates generally to the field of computing, and more particularly to electronic content analysis.

Every day billions of pieces of electronic content are authored and shared. A well-crafted and meaningful piece of authored content is developed in stages. These stages may last a fraction of second or take hours to develop. Often, content development may become stalled and content authors may resort to including poor quality elements in order to complete and release their content.

SUMMARY

Embodiments of the present invention disclose a method, computer system, and a computer program product for recommending additional content to an author generating authored content. The present invention may include monitoring a travel location associated with the author. The present invention may also include calculating a multi-sensory region based on the monitored travel location and a maximum sense distance value. The present invention may then include selecting at least one piece of additional content from a corpus of additional content based on the calculated multi-sensory region. The present invention may further include generating a data model based on the selected at least one piece of additional content. The present invention may also include selecting a relevant piece of additional content from the generated data model based on determining a topic associated with the selected relevant piece of additional content matches an authored topic associated with the authored content. The present invention may then include presenting the selected relevant piece of additional content to the author.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
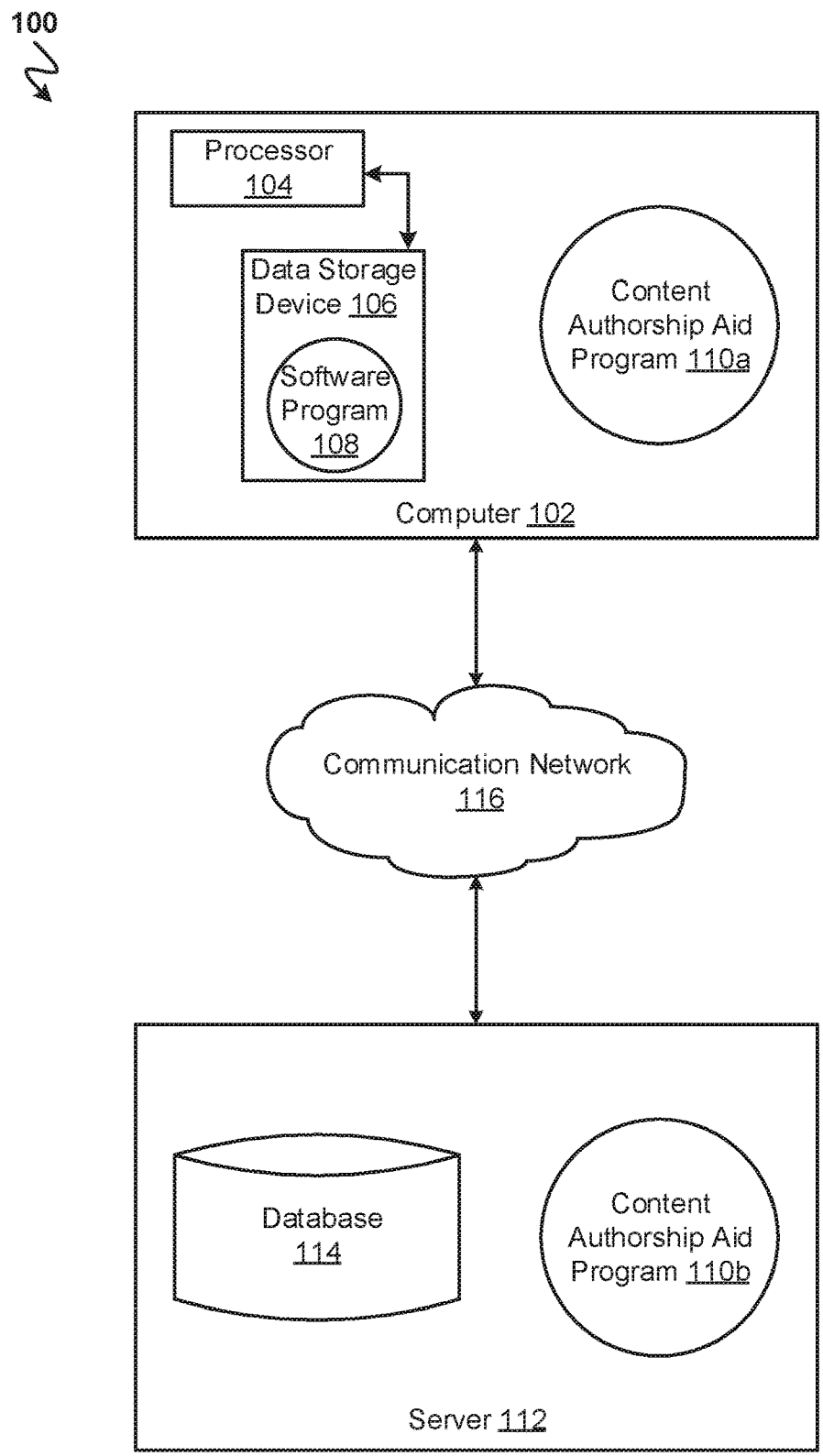
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for a multi-sensory content authorship aid. As such, the present embodiment has the capacity to improve the technical field of electronic content analysis by providing a multi-sensory based content authorship aid. More specifically, a content authorship aid program monitors the locations traveled by a user, calculates a multi-sensory region for the user around the monitored locations, selects related content and social data based on the calculated sensory region, generates a multi-sensory model, and then recommends additional content to the author based on the model.

As described previously, every day billions of pieces of electronic content are authored and shared. A well-crafted and meaningful piece of authored content is developed in stages. These stages may last a fraction of second or take hours to develop. Often, content development may become stalled and content authors may resort to including poor quality elements in order to complete and release their content. Furthermore, content authors may release content that could be enriched if additional information was made available to the content author. Identifying, collecting, and presenting additional content to an author that is meaningful from virtually numberless possible pieces of electronic content is difficult.

Therefore, it would be advantageous to, among other things, provide a dynamic way to automatically collect, filter, and present meaningful content for authors to aid content authorship. More specifically, additional content may be collected from electronic content providers that pertains to a geographic region that a user's five senses (i.e., sight, sound, smell, touch, and taste) may have experienced while travelling and may be presented to the user in an electronic content authorship program (e.g., word processor or social media application).

According to at least one embodiment, the content authorship aid program integrates with text editors, message composing editors, or any other program that allows content creation. Content authoring programs may, for example, integrate the content authorship aid program as a plugin, addon, or extension. The content authorship aid program may be activated based on user interaction via a menu or user interface (UI) in the content authoring program, detecting the user has paused while composing content (e.g., pause in typing or dictating content) beyond a threshold amount of time, detecting the user has focused on writing or begun composing content, or through other express actions or observed behavior of the user.

In embodiments, the content authorship aid program may initialize a default user profile that may be further adjusted according to the user's individual preferences. The user profile may include maximum sense distance values for each of the five senses (e.g., the sight maximum distance value may be a 20 foot radius) that are initialized to a default setting that the user may later adjust individually. The user profile may further include other user preferences, such as likes or dislikes (e.g., a user may omit certain senses, such as taste), content editors the user wants the content authorship aid program to be integrated with, specific modes of activation (e.g., have additional content presented only in response to the user clicking a button in the UI or to automatically present content without express action by the user), threshold time length during a pause before presenting additional relevant content, and so forth.

According to some embodiments, after a user profile is set up, the user may register or designate a mobile device (e.g., smartphone) with location tracking capabilities and consent to have the content authorship aid program monitor the user while travelling using the designated mobile device. In monitoring user travels, the content authorship aid program may record the location (e.g., via global positioning system (GPS), location precision/potential error radius, coordinates) and time at a location. According to at least one embodiment, the aggregate travels of multiple related users may be used as the basis for determining meaningful additional content. Such relation may be established based on various people that are known coworkers (e.g., work in the same real estate office or work as a team of engineers), friends, or are otherwise identified as related.

Thereafter, a multi-sensory region is calculated for the user based on one or more of the five senses and maximum distances specified for each sense in the user profile. As described previously, specific senses may be omitted by the user based on the user-provided information in the user profile. For example, a user may choose to omit smell and taste if the user finds such sense related content would be unprofessional, and may indicate these preferences in the user profile. According to at least one embodiment, a clustering algorithm, such as density-based spatial clustering of applications with noise (DBSCAN), may be used to select region segments, ignore outliers, and generate a geographic sensory region. The sensory region may be represented as a geofenced area where information is sourced until the user is finished authoring content.

Related content is then selected based on the calculated sensory region, content topic, and social data. The content authorship aid program may pull historic location data within a specific timeframe (e.g., within a threshold time from when the user was travelling) from social media networks, news services, messaging services, or other content sources. The selection of data may, for example, include native language, images, translations, and textual data. In embodiments, data may be sourced by using Apache Solr™ (Apache Solr and all Apache Solr-based trademarks and logos are trademarks or registered trademarks of the Apache Software Foundation and/or its affiliates) spatial queries, using Twitter filters by location, or using Gnip application programming interface (API) based on regions and coordinates of the sensory region determined by the region calculation. Once the data is sourced or collected, the data may be organized into a data structure that, according to some embodiments, includes at least a source (e.g., social media source), location (e.g., geographic coordinates), content (e.g., the text comment posted on a social network), and an author (e.g., an identifier corresponding with the person that wrote the content). According to at least one embodiment, natural language processing (NLP) may be employed to analyze the content in the sourced additional content data and identify the corresponding sense that may also be added to the data structure.

Based on the selected content, a multi-sensory model is built. The multi-sensory model may model existing language and frequency in order to generate additional content for the author. Content may be ordered within the model based on weighting senses and overlap of the senses. According to some embodiments, a more complicated model may be generated which may model graphical ontology or fragment frequency and selection.

Finally, content is recommended to the author. In embodiments, content may be recommended to the author in response to the author clicking on a button or after determining the user has paused for a threshold amount of time. The content authoring program (e.g., text editor) may be queried to determine the subject of the content that is being created. The subject may be determined, for example, by analyzing the text the user has entered or the heading for the section of content the user is currently composing. Based on the determined subject, data may be selected from the model. The selected data may then be loaded into a template, such as a sentence or quote format. The completed template with additional content data may then be presented to the author. According to some embodiments, the process for selecting additional content may be recalculated after detecting that a paragraph or a sentence written by the author is complete in the content authoring program.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a content authorship aid program 110a. The networked computer environment 100 may also include a server 112 that is enabled to run a content authorship aid program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, wearable device or any type of computing devices capable of running a program, accessing a network, and accessing a database 114. According to various implementations of the present embodiment, the content authorship aid program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the content authorship aid program 110a, 110b (respectively) to receive relevant additional content recommendations based on a multi-sensory region. The content authorship aid method is explained in more detail below with respect to FIG. 2.

According to at least one embodiment, the content authorship aid program 110a and 110b integrates with a text editor, message composition editor, dictation software, or other software program 108 used for content authoring. Content authoring programs may, for example, integrate the content authorship aid program 110a and 110b as a plugin, addon, or extension. In embodiments, the content authorship aid program 110a and 110b may be a standalone application. In the case of an integrated program, the content authorship aid program 110a and 110b may be activated based on user interaction via a menu or user interface (UI) in the content authoring program, detecting the user has paused while composing content (e.g., pause in typing or dictating content) beyond a threshold amount of time (e.g., 30 seconds), detecting the user has focused on writing (e.g., through image analysis of a user face and visual focus using a camera connected to an electronic device), begun composing content (e.g., detecting typing in an editor), or through other express actions or observed behavior of the user. According to some embodiments, the content authorship aid program 110a and 110b may create a button or other UI feature within the content authoring program that the user may click using a mouse, tap with a finger using a touchscreen, or otherwise interact with to begin the content authorship aid program 110a and 110b.

In embodiments, a user profile is initialized. The content authorship aid program 110a and 110b may initialize a default user profile that may be adjusted later according to the user's individual preferences. The user profile may include maximum distance values for each of the five senses (i.e., sound, sight, smell, touch, and taste) that are initialized to a default setting that the user may adjust. For example, the content authorship aid program 110a and 110b may initialize a maximum sight distance value to be a 20 foot radius, a maximum sound distance value to be a 100 foot radius, a maximum touch distance value to be a 3 foot radius, a maximum smell distance value to be a 5 foot radius, and a maximum taste distance value to be a 1 foot radius. Thereafter, the user may open the user profile to adjust the maximum distance values.

For example, the user may right-click on a button within a content authorship program corresponding with the content authorship aid program 110a and 110b and a menu may appear that includes a choice for the user to adjust their user profile. In response to the user selecting the option to adjust their user profile, a UI box may be presented on screen that displays, at least, the five senses and the current maximum distance values for each sense. The distances may then be adjusted by the user using a text box, a slider, or other UI feature. For example, the user may adjust the default maximum sight distance value from the default 20 foot radius to a 25 foot radius. Thereafter, the user may select a button to save the new profile preferences.

Additionally, the user profile may include other user preferences, such as likes or dislikes, identifying the content editors the user wants the content authorship aid program 110a and 110b to be integrated with, preferred modes of activation (e.g., have additional content presented only in response to the user clicking a button in the UI or to automatically present content without express action by the user), threshold time length during a pause before presenting additional content, and so forth. The likes and dislikes preferences may include specific senses (e.g., a user may omit or dislike certain senses, such as taste, that the user finds to be inappropriate for the content the user creates), certain subjects (e.g., likes cars and dislikes snow), or both. According to alternative embodiments, user preferences of senses or subjects that the user likes or dislikes may be derived based on historical user data. The user profile may also include designated mobile devices (e.g., computer 102) with location tracking capabilities (e.g., global positioning system (GPS) receiver or other location sensors) that will allow content authorship aid program 110a and 110b to monitor the user's travel. When the user selects one or more devices for monitoring user travel, the user may be presented with a dialog box or other notification that obtains user consent for such monitoring. In response to appropriate user consent, the content authorship aid program 110a and 110b may add the designated device to the user profile for use in monitoring the user.

Figure 2:
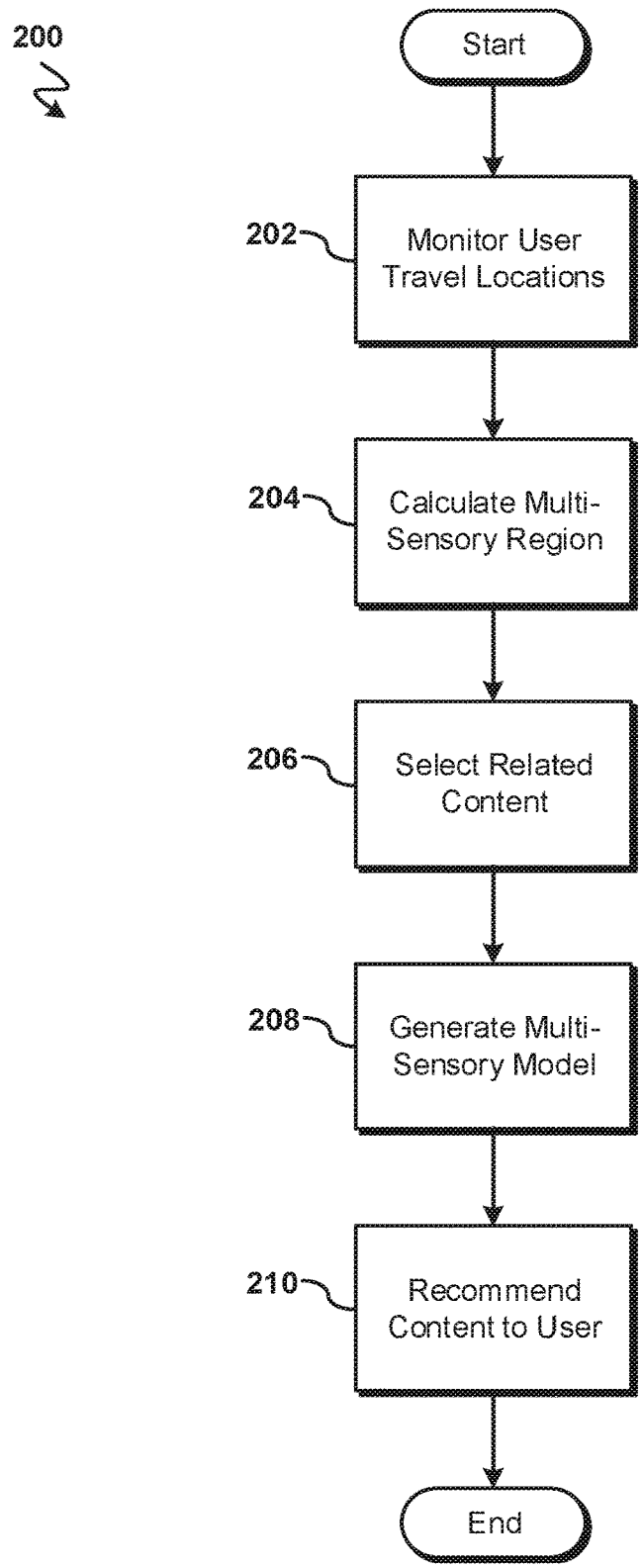
FIG. 2 is an operational flowchart illustrating a process for aiding content authorship according to at least one embodiment.

Referring now to FIG. 2, an operational flowchart illustrating the exemplary content authorship aid process 200 used by the content authorship aid program 110a and 110b according to at least one embodiment is depicted.

At 202, the travel locations of a user are monitored. For each user (i.e., author), locations are recorded using GPS, a location precision or potential error radius is recorded, coordinates for the location, and an amount of time at the location are recorded. Based on monitoring the location, and changes in location, of a mobile device that corresponds with the user, the travel route of the user may be monitored and recorded. Travel may be monitored by a mobile device and transmitted via a communication network 116 to a computer 102 that is running the content authorship aid program 110a and 110b.

For example, the location of user Fred may be tracked by querying a GPS receiver in the smartphone that Fred designated in his user profile. As Fred commences a short trip in the Boston area from his office to a train station, Fred's location is monitored based on the changing location of Fred's smartphone. Using the collected GPS data, the content authorship aid program 110a and 110b determines that Fred is in the Boston area and Fred traveled from an office building to a train station and the route that Fred took. The travel location information may then be stored in a data repository, such as a database 114. More specifically, Fred's travels may be recorded in a semi-structured format according to the example shown below.

{Fred, Real Estate Office, Stationary, 8 hours—Thursday 8 AM}
{Fred, To Yawkey Station, Transitory, 30 minutes—Thursday 4 PM, Dwell Location: Fenway Park, Lansdowne Street}}
{Fred, Wait, Yawkey Station, Stationary, 15 minutes—Thursday 4:30 PM}
{Fred, Identified Commute Route, Transitory, 30 minutes—Thursday 4:45 PM, Dwell Location: {Boston Landing, Brookline}}
{Fred, Store, Groceries Chestnut Hill, Stationary, 15 minutes—Thursday 5:15 PM}

As shown in the above example, data entries of Fred's travels may include a user identifier (e.g., Fred), the location as a fixed location (e.g., train station) or a route (e.g., identified commute route), user movement (e.g., stationary versus transitory), the length of time the user was at the location, a time stamp (e.g., day and hour), and a dwell location, if applicable. Routes may be identified over time based on historical data, identified by the user in the user profile, or by some other method. Location names may be determined by inputting collected raw coordinates of locations the user visited into mapping software which may be running on a server 112 and receiving (e.g., via a communication network 116) location names from the mapping software.

According to alternative embodiments, the content authorship aid program 110a and 110b may use multiple users for travel and location data to use for sourcing meaningful content. If the user works at a real estate office, fellow coworker travel data may be combined for use in later steps of the content authorship aid process 200. Additional users designated to pool together may, for example, be specified in the user profile.

Next, at 204, a multi-sensory region is calculated. According to embodiments, the user profile may be accessed to determine the recorded maximum sense values (e.g., 100 foot radius for sound). The accessed maximum sense values may then be used in conjunction with the previously determined travel data to calculate and define a geographic sense region. For example, if the user profile defined the maximum sight distance to be a 20 foot radius, a region would be calculated that encompasses a 20 foot radius along the route the user previously traveled as the sight sense region. Likewise, additional sense regions may be calculated for the remaining senses. In embodiments, the multi-sensory region may be the aggregate or maximum of the sensory regions calculated. The multi-sensory region may be represented as a geofenced area where information is sourced until the user is finished authoring content.

Then, at 206, content related to the multi-sensory region is selected. The content authorship aid program 110a and 110b may access social network feeds or other electronic content sources or feeds (i.e., corpus of additional content) to obtain raw content data. For example, GNIP may be used to obtain raw Twitter data that is then saved to a data repository, such as a database 114. Thereafter, the raw content data may be fed into a data processing system. For content that has no expressly identified originating location, the originating location may be determined based on information in the raw content (e.g., a place identifier corresponding with a Tweet) and the determined originating location may be added to the raw data.

The content may be further augmented by adding sense labels. In embodiments, textual electronic content that is in natural language form may be analyzed using natural language processing (NLP) techniques to parse and break down elements of the textual content to identify a sense related to the content. The content may be labeled based on predefined word or phrase mappings or dictionaries. For example, if user content included the word "shiny," the content may be associated with the sense sight based on a mapping of the word shiny to sight and a "sight" tag may be added to augment the collected raw data. In other instances, content may include images that are analyzed using image analysis algorithms to determine a corresponding sense such as sight or other sense. For example, if an image is a zoomed view of an object with a bumpy surface, the image may be tagged with the sense "touch." Additionally, mixed content that includes, for example, images and text may entail analyzing both the image and text to determine the appropriate sense tags.

The raw content data may be saved in a format such as the format shown in the example below.

```
{
  "Source" : "Twitter"
  "Location" : {42.317913, −71.008011}
  "Content" : "Finally a new house on the market . . . took long enough"
  "Sense" : "Sight"
  "Author" : "@Engineer"
  "Time" : "Thursday 9:12 AM"
}
```

As depicted in the above example, each piece of collected content may include the source (e.g., social media source or blog), geographic location (e.g., expressed as coordinates of longitude and latitude), the content (e.g., Tweet or other social media posting), the tagged one or more senses (e.g., sight, sound, taste, touch, or smell), an identifier corresponding with the author, and a time stamp. It will be appreciated that the collected content data may be stored, formatted, and augmented in various other ways based on design and implementation requirements.

Thereafter, the augmented data may be partitioned into a coordinate system based on the geographic locations corresponding with the pieces of data. A clustering algorithm, such as density-based spatial clustering of applications with noise (DBSCAN), may be used to select region segments, ignore outliers, and generate a geographic sensory region. DBSCAN may be used by the content authorship aid program 110a and 110b to analyze geographic points of the user's travels and obtain content that is clustered around the selected point and within the boundaries of the multi-sensory region. Alternatively, a query may be generated to query the collected social media data based on location. By using the geofenced boundaries of the multi-sensory region, a data query or DBSCAN may be used to identify and select relevant content that was generated within the multi-sensory region. Content may be selected by comparing the originating location of the content to the sensory region associated with the sense assigned to the content. For example, if the user profile specifies that the maximum sight distance value is a 20 foot radius, content that was identified as relating to the sight sense with an originating location within a 15 foot radius of a location the user visited would be selected while sight content that has an originating location of 25 feet from a user location would not be selected. Similar filtering would occur for the rest of the available content. According to at least one other embodiment, relevant content may also be selected from within the multi-sensory region if the content was also generated within a threshold time of when the user was at a given location.

At 208 a multi-sensory model is generated from the selected content. After the related content is selected, a multi-sensory data model may, according to some embodiments, be generated according to a predefined format. The multi-sensory data model may model the existing language and frequency in order to generate language. In some embodiments, the multi-sensory data model may model select data based on a certain time of day (e.g., 7 AM). The model may also include the people (i.e., authors) that generated content and the frequency of instances of generated content per person. The data model may then identify keywords (e.g., nouns or adjective noun combinations) from the selected content and, based on dictionaries or NLP techniques, a topic may be assigned to the identified keywords.

For example, the following content may be selected based on the multi-sensory region.

```
{
   "Source" : "Twitter"
   "Location" : {42.317913, -71.008011}
   "Content" : "Finally a new house on the market . . . took long enough"
   "Sense" : "Sight"
   "Author" : "@Engineer"
}
{
   "Source" : "Twitter"
   "Location" : {42.317913, -71.008011}
   "Content" : "Sale at Grocery Store"
   "Sense" : "Sight"
   "Author" : "@Jeanette"
}
```

From the selected content, an exemplary multi-sensory data model may be generated as follows.

```
Model - Time - 7 AM
People { @Engineer - Frequency = 1, @Jeanette - Frequency = 1 }
Content Model {
   House: 1 - { @Engineer } - { Topic: Real Estate },
   Market: 1 - { @Engineer } - { Topic: Real Estate },
   Food: 1 - { @Jeanette } - { Topic: Food },
}
```

In the above example model, the model is based on a time (i.e., 7 AM). The model includes a list of people that authored the content that was selected which, in this case, includes content authored by "@Engineer" and "@Jeanette" and one piece of content was selected from each of them (i.e., frequency is 1). Then, the content model is generated based on the selected content. Out of the selected content, three keywords were identified: "house," "market," and "food." Each keyword appeared once, therefore the "1" after the keyword signifies the word frequency of one. The model then identifies the author(s) that used the keyword in their content. Finally, the content is analyzed (e.g., using NLP) to determine the topic that the content relates to, such as real estate or food. In alternative embodiments, the model may also indicate the sense associated with the content.

Content within the content model may be weighted or ordered or both. For example, content that is identified as corresponding with more than one sense (e.g., a thunderstorm may correspond with sight and sound) may be weighted higher than content that corresponds with a single sense. Further, certain senses may correspond with greater weights based on predetermined ranking (e.g., sight weighted heavier than sound) or a user preference stored in the user profile may allow the user to specify senses that are most important to the individual user.

According to other embodiments, the content authorship aid program 110a and 110b may generate more complex models such as a graphical ontology or fragment frequency and selection.

Then, at 210, relevant content from the multi-sensory model is recommended to the author. Based on the specific implementation and user preferences, the content authorship aid program 110a and 110b may begin recommending and presenting additional content in response to the author clicking on a UI button, selecting the appropriate menu option, after determining the user has paused for a threshold amount of time, continuously while the user is typing, or other triggering event criteria. The content authoring program (e.g., text editor) may be queried (e.g., through an application programming interface (API)) to determine the subject of the authored content that is being created. The subject or authored topic may be determined, for example, by analyzing the text the user has entered or the heading for the section of content the user is currently composing. In embodiments, text analysis may be accomplished through the use of NLP algorithms to identify a topic from natural language text strings in the document body, heading, the author expressly designating a subject, or other methods. When analyzing headings, the content authorship aid program 110a and 110b may use the content authoring program API or identify predefined tags corresponding with heading text.

For example, if an author is writing about the topic of baseball, certain words or phrases may be identified in the text the author is generating which are correlated with baseball, such as "shortstop," "base hit," and "inning." Using NLP to determine the presence of words related to baseball, the content authorship aid program 110a and 110b will designate the current topic to be baseball. Thereafter, the multi-sensory model is searched to select content that is tagged with the topic of baseball.

Content with the matching (or in some embodiments, most similar) topic is selected for recommending to the author. In instances with more than one piece of relevant content, the highest weighted or ordered content is selected. In other embodiments, multiple pieces of relevant content may be presented to the author.

The selected content data may then be loaded into a template. Templates may include various predefined formats that present the content data together with additional data such as the identifier corresponding with the author of the selected content. According to at least one embodiment, the selected content may be loaded into a sentence template that presents the content in an adjective subject verb pattern. In other embodiments, the content may be loaded into a quote template that may be formatted to read "As <Author> says, <Quote Selected Content>" or another defined quote format.

The completed template with selected content data may be presented to the author within the content editor using the content authorship aid program 110a and 110b. According to some embodiments, the selected content, formatted according to a template, may be presented within the content editor in a designated partition of the UI. For example, within a word processor, a pane may be displayed within the right-hand side of the UI. Within the pane, the selected content is displayed to the author. In other embodiments, a UI box, such as a dialog box, may appear containing the selected content in response to the author clicking a button corresponding with the content authorship aid program 110a and 110b.

According to alternative embodiments, the amount of additional content that is recommended to the author may be limited to facilitate the maximum amount of organic contribution by the author to their content. For example, selected content may not be presented to the author if the percentage of the content the author is generating from recommended additional content exceeds a threshold percentage.

It may be appreciated that FIG. 2 provides only an illustration of one embodiment and does not imply any limitations with regard to how different embodiments may be implemented. Many modifications to the depicted embodiment(s) may be made based on design and implementation requirements.

According to another embodiment, the content authorship aid program 110a and 110b may capture natural language segments that describe subjects from different views or perspectives. For example, if the author is writing on the subject of cars, content may be recommended that includes positive adjectives such as "shiny new car" and content that includes negative adjectives such as "rusty old car."

In another alternative embodiment, raw collected content may be translated according to globalized or localized definitions. Viewers and authors of content may interpret or define different words, phrases, or slang differently based on their locality. Thus, the target audience for the content the author is creating may be determined (e.g., from historical demographic data of the audience of previous content from the author) and then the appropriate translation may be applied before presenting to the selected content to the author.

As described in embodiments above, the content authorship aid program 110a and 110b may improve the functionality of a computer by enabling a computer to efficiently analyze electronic content data and then effectively identify relevant additional content for an author. The amount of possible electronic content data to draw from to suggest to an author is enormous. The above embodiments provide a dynamic and efficient way to narrow the pool of candidate data to include content emanating from locations within sensory perception of the author and determine additional content to recommend based on the subject of the content the user is currently authoring.

Figure 3:
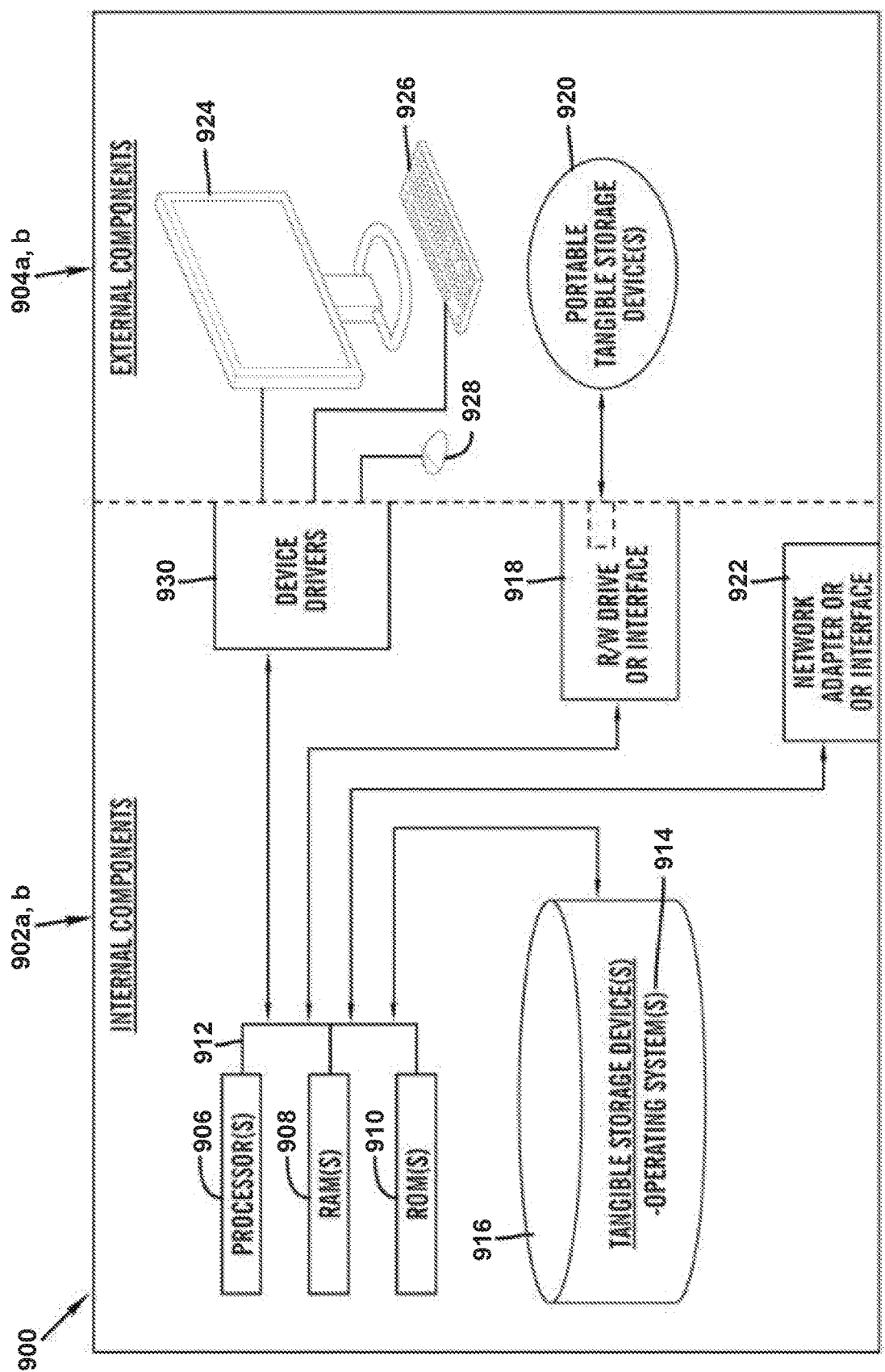
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the content authorship aid program 110a in client computer 102, and the content authorship aid program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the content authorship aid program 110a and 110b can be stored on one or more of the respective portable computer-readable tangible storage devices 920, read via the respective RAY drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the content authorship aid program 110a in client computer 102 and the content authorship aid program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the content authorship aid program 110a in client computer 102 and the content authorship aid program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
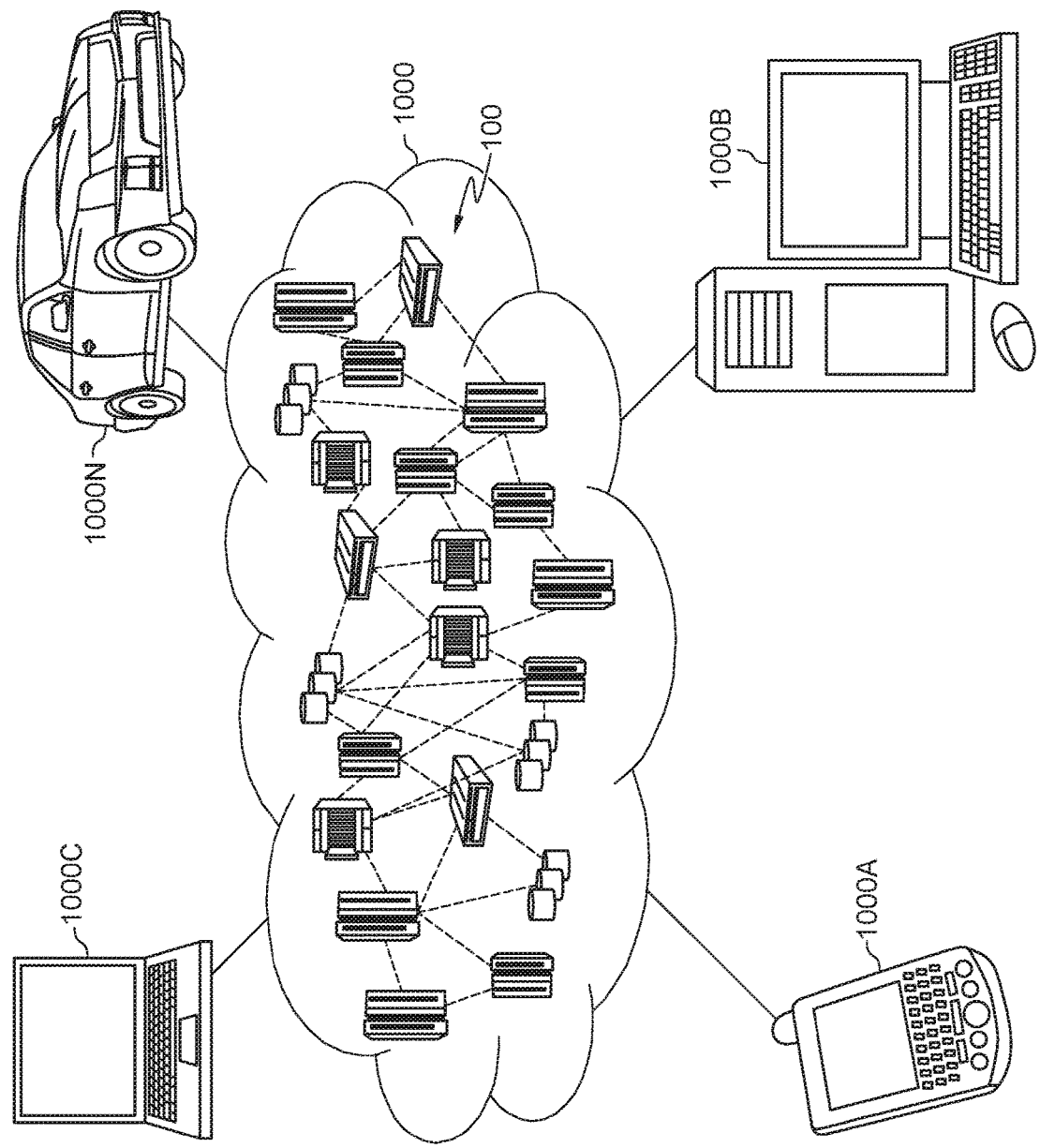
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
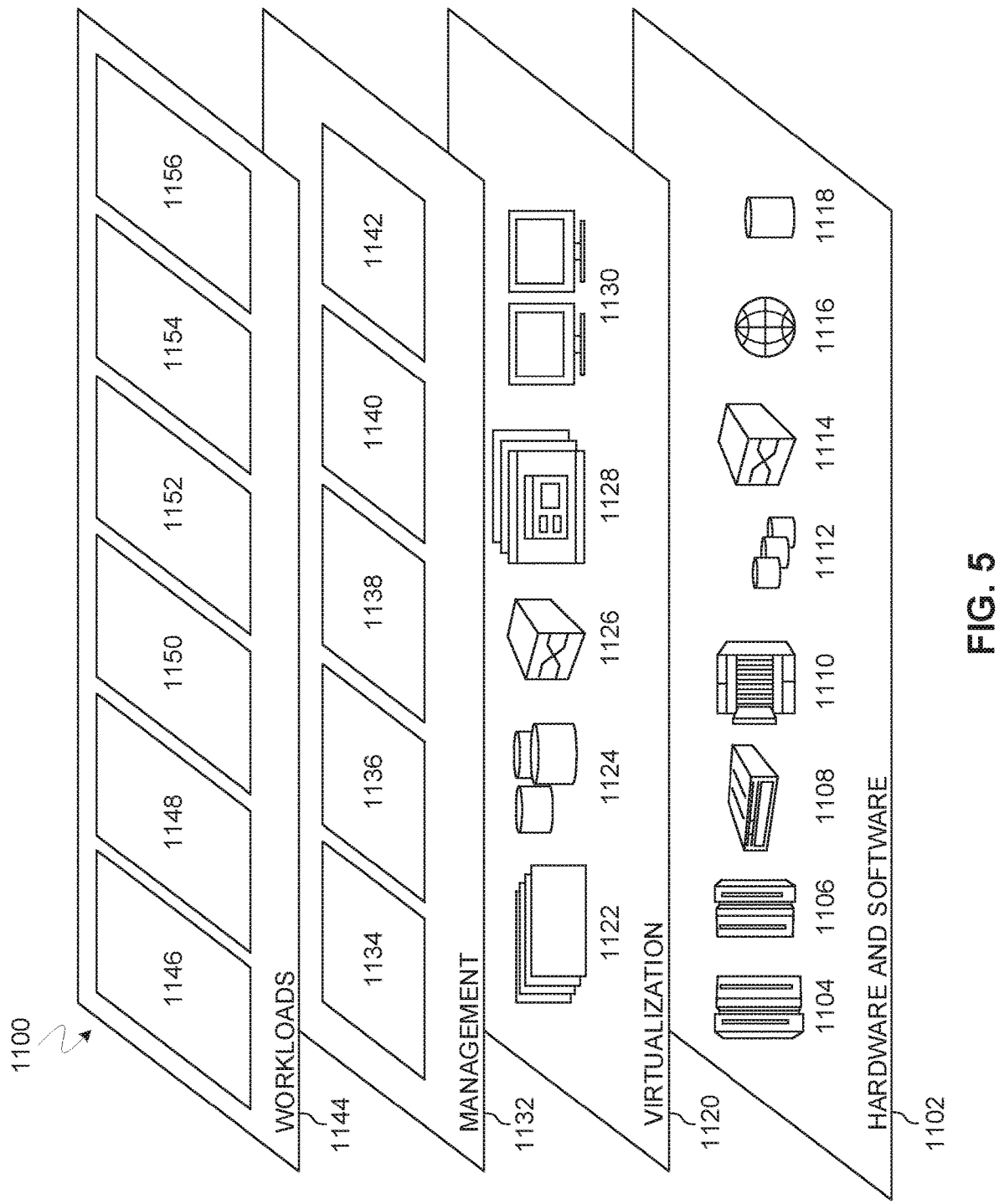
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and content authorship aid 1156. A content authorship aid program 110a, 110b provides a way to identify and present content originating from within a multi-sensory region to aid content authors.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for content authorship aid, the computer program product comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   detecting a pause of a user activity of a user exceeding a threshold amount of time;
   based on the detection, querying based on one or more inputs associated with the user; and
   based on the querying, presenting a recommendation including at least one piece of additional content from a corpus of additional content via calculating a multi-sensory region based on a monitored travel location and one or more of the five sense including sight, sound, smell, touch and taste and a maximum sense distance value for each sense associated with the user;
   selecting at least one piece of additional content from the corpus of additional content based on the calculated multi-sensory region;
   generating a data model based on the selected at least one piece of additional content; and
   selecting a relevant piece of additional content from the generated data model based on determining a topic associated with the selected relevant piece of additional content matches the topic ascertained from the one or more inputs;
   wherein presenting the recommendation includes presenting the selected relevant piece of additional content to the user.

2. The computer system of claim 1, wherein the pause includes one or more of lack of the user typing, lack of the user dictating, and lack of a user visual activity acquired via an image analysis of the face of the user.

3. The computer system of claim 1, wherein selecting the at least one piece of additional content from the corpus of additional content based on the calculated multi-sensory region comprises determining an originating location associated with the at least one piece of additional content is within the calculated multi-sensory region.

4. The computer system of claim 1, further comprising program instructions to:
   initializing a user profile for the author, wherein the initialized user profile includes a plurality of maximum sense distance values, and wherein the plurality of maximum sense distance values includes the maximum sense distance value.

5. The computer system of claim 4, further comprising program instructions to:
   collecting at least one user profile adjustment from the user; and
   adjusting the initialized user profile based on the collected at least one user profile adjustment.

6. The computer system of claim 1, wherein selecting the at least one piece of additional content from the corpus of additional content based on the calculated multi-sensory region further comprises:
   determining a sense associated with the selected at least one piece of additional content; and
   determining a distance from the originating location to the monitored travel location is less than the maximum sense distance value corresponding with the determined sense.

7. The computer system of claim 6, wherein determining the sense associated with the selected at least one piece of additional content comprises comparing a textual content of the selected at least one piece of additional content to a word mapping.

8. The computer system of claim 1, wherein presenting the selected relevant piece of additional content comprises formatting the selected relevant piece of additional content according to a template and presenting the formatted relevant piece of additional content to the user within a content authoring program the user is using.

9. A computer-implemented method for content authorship aid, the method comprising:
   detecting, via a computing device, a pause of a user activity of a user exceeding a threshold amount of time;
   based on the detection, querying, via the computing device, based on one or more inputs associated with the user; and
   based on the querying, presenting, via the computing device, a recommendation including at least one piece of additional content from a corpus of additional content via calculating a multi-sensory region based on a monitored travel location and one or more of the five sense including sight, sound, smell, touch and taste and a maximum sense distance value for each sense associated with the user;

selecting at least one piece of additional content from the corpus of additional content based on the calculated multi-sensory region;

generating, via the computing device, a data model based on the selected at least one piece of additional content; and selecting, via the computing device, a relevant piece of additional content from the generated data model based on determining a topic associated with the selected relevant piece of additional content matches the topic ascertained from the one or more inputs;

wherein presenting the recommendation includes presenting the selected relevant piece of additional content to the user.

10. The computer-implemented method of claim 9, wherein the pause includes one or more of lack of the user typing, lack of the user dictating, and lack of a user visual activity acquired via an image analysis of the face of the user.

11. The computer-implemented method of claim 10, wherein selecting the at least one piece of additional content from the corpus of additional content based on the calculated multi-sensory region comprises determining an originating location associated with the at least one piece of additional content is within the calculated multi-sensory region.

12. The computer-implemented method of claim 10, further comprising program instructions to:

initializing, via the computing device, a user profile for the user, wherein the initialized user profile includes a plurality of maximum sense distance values, and wherein the plurality of maximum sense distance values includes the maximum sense distance value.

13. The computer-implemented method of claim 12, further comprising program instructions to:

collecting at least one user profile adjustment from the user; and adjusting the initialized user profile based on the collected at least one user profile adjustment.

14. The computer-implemented method of claim 9, wherein selecting the at least one piece of additional content from the corpus of additional content based on the calculated multi-sensory region further comprises:

determining, via the computing device, a sense associated with the selected at least one piece of additional content; and determining, via the computing device, a distance from the originating location to the monitored travel location is less than the maximum sense distance value corresponding with the determined sense.

15. The computer-implemented method of claim 14, wherein determining the sense associated with the selected at least one piece of additional content comprises comparing a textual content of the selected at least one piece of additional content to a word mapping.

16. The computer system of claim 9, wherein presenting the recommendation comprises formatting the selected relevant piece of additional content according to a template and presenting the formatted relevant piece of additional content to the user within a content authoring program the user is using.

17. A computer program product for content authorship aid, comprising a computer-readable storage medium having program instructions embodied therewith, the program instructions executable by a computer to cause the computer to perform a method comprising:

detecting a pause of a user activity of a user exceeding a threshold amount of time;

based on the detection, querying based on one or more inputs associated with the user; and based on the querying, presenting a recommendation including at least one piece of additional content from a corpus of additional content via calculating a multi-sensory region based on a monitored travel location and one or more of the five sense including sight, sound, smell, touch and taste and a maximum sense distance value for each sense associated with the user;

selecting at least one piece of additional content from the corpus of additional content based on the calculated multi-sensory region;

generating a data model based on the selected at least one piece of additional content; and selecting a relevant piece of additional content from the generated data model based on determining a topic associated with the selected relevant piece of additional content matches the topic ascertained from the one or more inputs;

wherein presenting the recommendation includes presenting the selected relevant piece of additional content to the user.

* * * * *